United States Patent [19]
Koyama et al.

[11] Patent Number: 5,347,503
[45] Date of Patent: Sep. 13, 1994

[54] OPTICAL INFORMATION PROCESSING APPARATUS FOR CORRECTING LINEARITY OF A PHOTOSENSOR OUTPUT WITH RESPECT TO POWER OF AN EMITTED LIGHT BEAM

[75] Inventors: Osamu Koyama; Tadashi Kato, both of Kawasaki; Masayuki Usui, Yokohama; Yoshihiko Watanabe, Yokohama; Hisatoshi Baba, Yokohama; Hirotake Ando, Tokyo; Hideo Nakajima; Shinji Sakai, both of Yokohama; Kenji Tamaki, Tokyo, all of Japan

[73] Assignee: Canon Kabushiki Kaisha, Tokyo, Japan

[21] Appl. No.: 154,385

[22] Filed: Nov. 18, 1993

Related U.S. Application Data

[63] Continuation of Ser. No. 562,021, Aug. 2, 1990, abandoned.

[30] Foreign Application Priority Data

Aug. 4, 1989 [JP] Japan ................................. 1-203069

[51] Int. Cl.⁵ .............................................. G11B 7/00
[52] U.S. Cl. .................................. 369/44.32; 369/116
[58] Field of Search .............. 369/44.41, 44.42, 44.32, 369/44.35, 44.36, 116

[56] References Cited

U.S. PATENT DOCUMENTS

| | | | |
|---|---|---|---|
| 4,051,329 | 9/1977 | Blondet et al. | 369/116 |
| 4,093,961 | 6/1978 | Kanamaru | 369/116 |
| 4,162,398 | 7/1979 | Kayanuma | 369/116 |
| 4,363,116 | 12/1982 | Kleuters et al. | 369/44.26 |
| 4,549,190 | 10/1985 | Ohara | 369/116 |
| 4,631,712 | 12/1986 | Matsubayashi et al. | 369/44.33 |
| 4,698,797 | 10/1987 | Komatsu | 369/116 |
| 4,707,817 | 11/1987 | Yoshio | 369/44.36 |
| 4,853,917 | 8/1989 | Koyama et al. | |
| 5,039,202 | 8/1991 | Koyama et al. | 369/44.11 |
| 5,067,117 | 11/1991 | Shimizu et al. | 369/116 |

Primary Examiner—Donald E. McElheny, Jr.
Attorney, Agent, or Firm—Fitzpatrick, Cella, Harper & Scinto

[57] ABSTRACT

An optical information processing apparatus includes a light source for radiating a light beam onto an optical information recording medium. A first photosensor is provided for partially receiving the light beam emitted from the light source and generating an output, and a second photosensor is provided for receiving either a light beam reflected by the recording medium or a light beam transmitted through the recording medium and generating an output. A control circuit controls power of the light beam emitted from the light source using the output from the first photosensor, and a correction circuit automatically corrects linearity of the output of the first photosensor with respect to the power of the light beam emitted from the light source in accordance with the output from the second photosensor.

9 Claims, 19 Drawing Sheets

F I G. 1
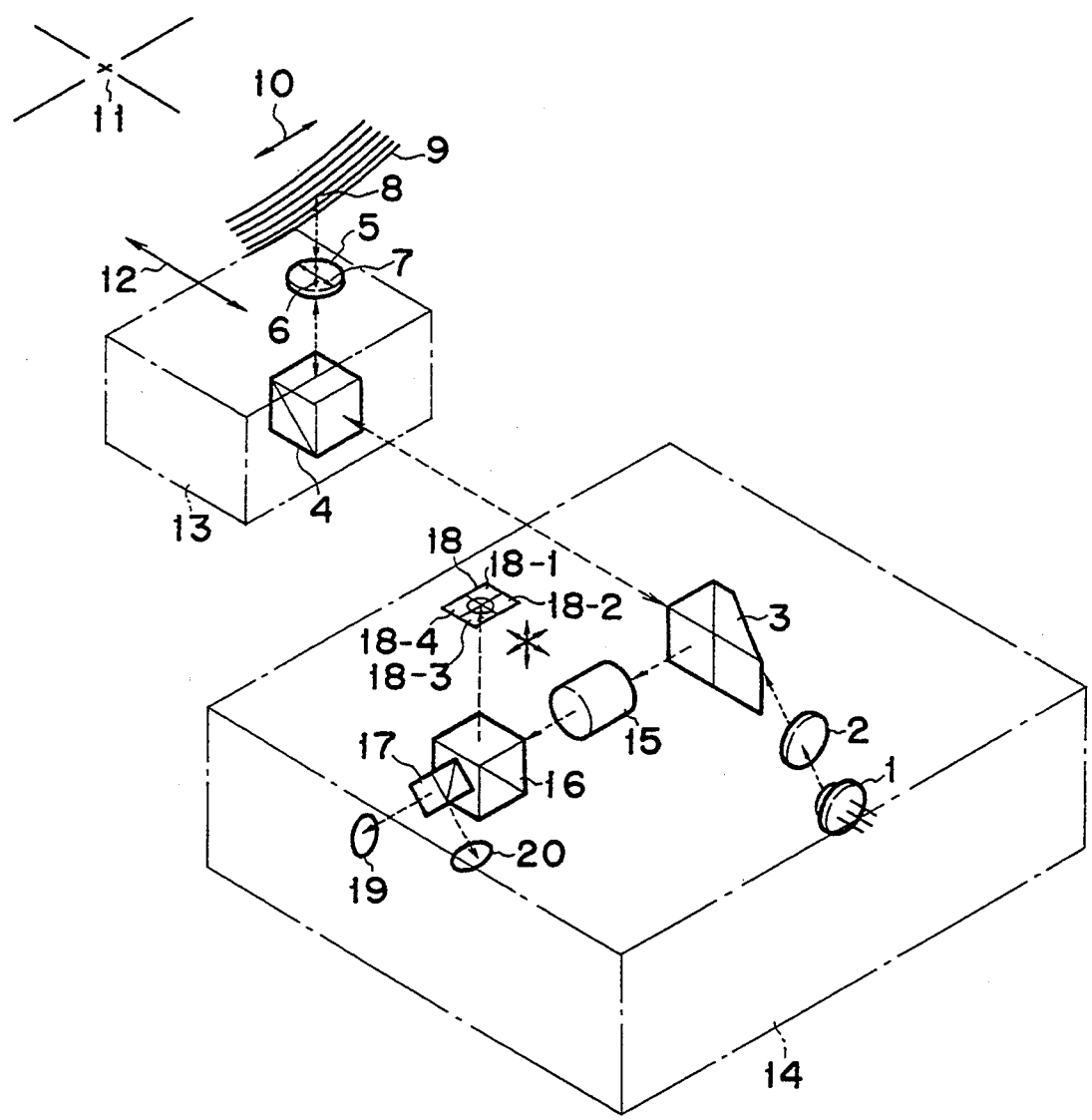

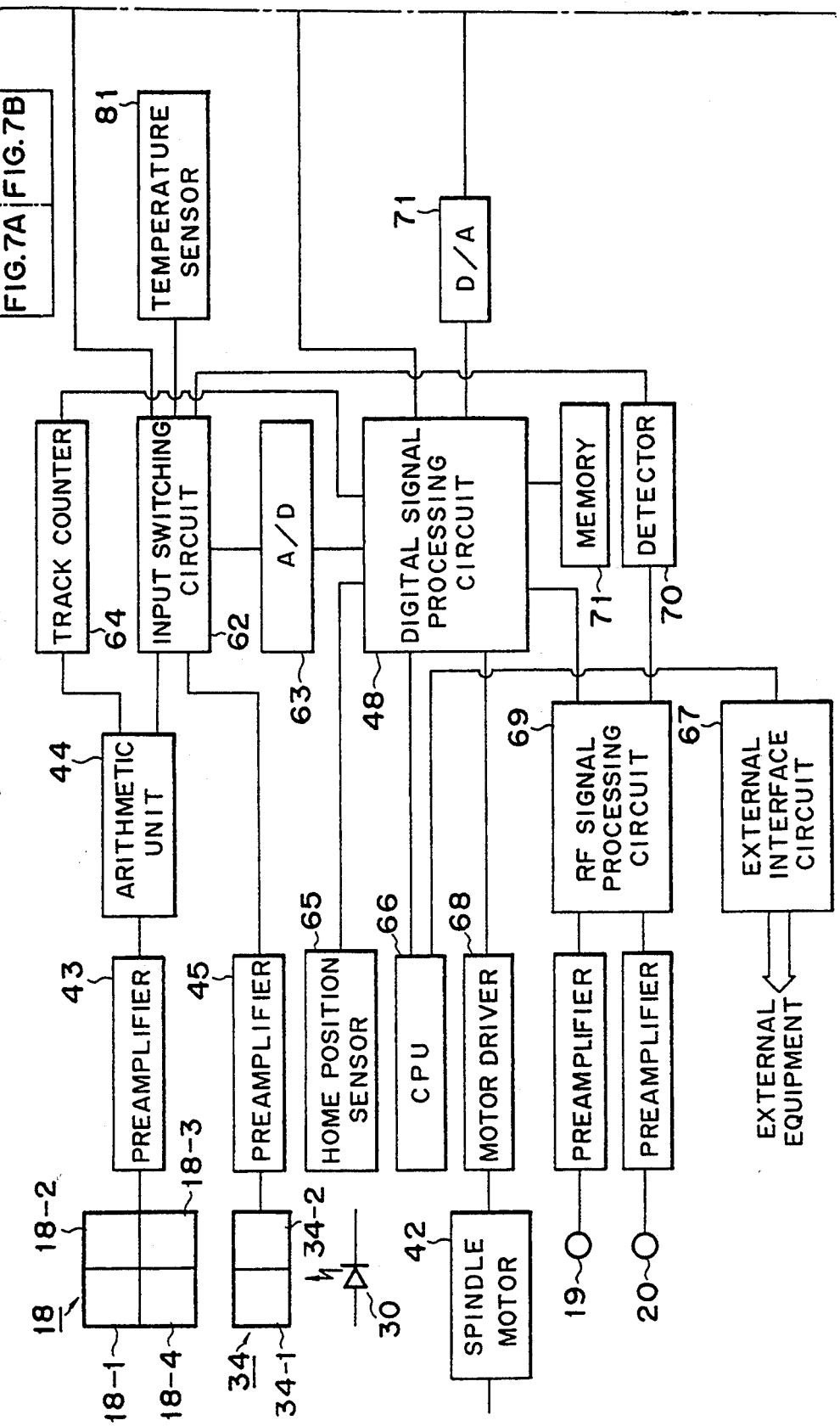

x > y

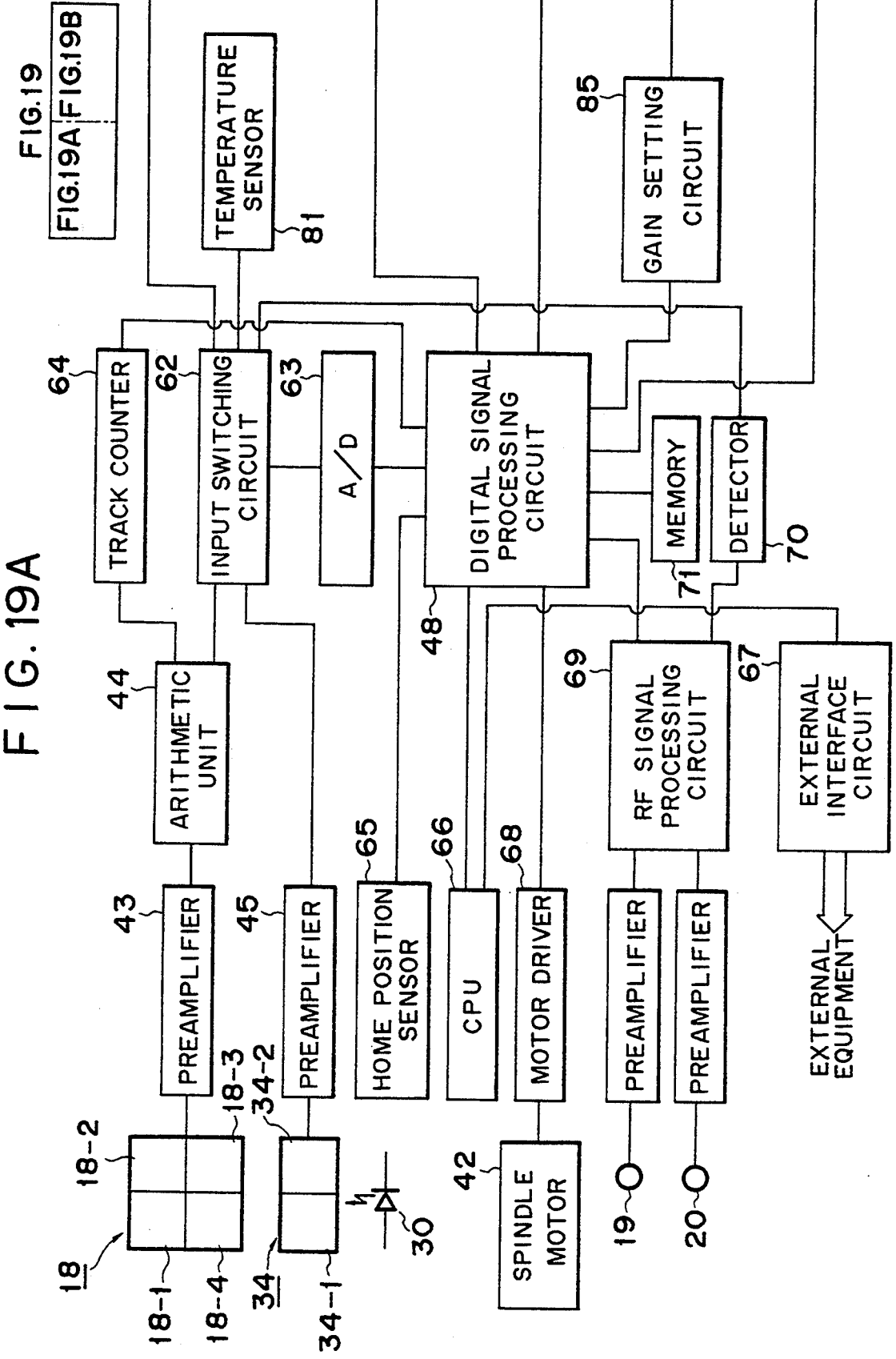

F I G. 20
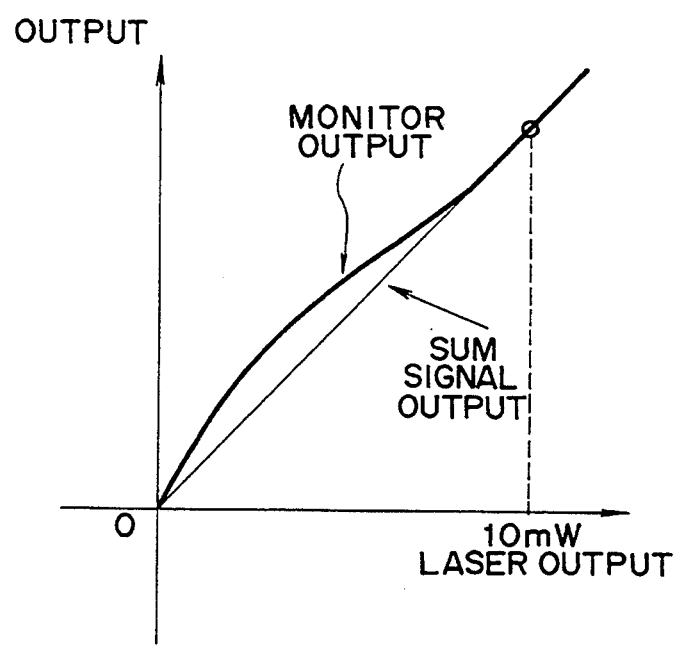

OPTICAL INFORMATION PROCESSING APPARATUS FOR CORRECTING LINEARITY OF A PHOTOSENSOR OUTPUT WITH RESPECT TO POWER OF AN EMITTED LIGHT BEAM

This application is a continuation of prior application Ser. No. 07/562,021 filed Aug. 2, 1990, now abandoned.

BACKGROUND OF THE INVENTION

1. Field of the Invention

The present invention relates to an optical information processing apparatus for recording and/or reproducing information on/from an optical recording medium such as an optical disk.

2. Related Background Art

Recently, a "digital signal processing method" of performing digital signal processing in place of conventional analog processing has become popular, and is widely used in practical applications such as compact disks (CDs), digital audio tapes (DATs), communication lines, and the like. The "digital signal processing method" has many merits since a complicated signal processing algorithm can be realized by software. For example, a hardware system can be simplified, system cost can be reduced, changes in specifications such as selection of filter constants, algorithms, and the like can be flexibly made, and so on. In addition, along with the progress in IC techniques, inexpensive digital signal processing integrated circuits (ICs), and digital signal processors (DSPs) are commercially available.

An optical information processing apparatus such as an optical disk has rapidly progressed as a high-density, large-capacity memory from a compact disk (CD) player to a rewritable magnetooptical disk apparatus via a direct-read-after-write (DRAW) type apparatus. In particular, a magnetooptical disk apparatus is required to have high reliability and a high access speed in addition to the above-mentioned high-density, large-capacity features as an external memory of a computer.

For this reason, an electrical servo system requires control as a complicated combination of outputs from various sensors. A magnetooptical disk apparatus will be exemplified below with reference to FIG. 1.

In FIG. 1, a light beam emitted from a semiconductor laser 1 is collimated by a collimator lens 2, and the collimated beam is converted by a polarization beam splitter 3 with a beam shaping function into a light beam having a substantially circular section. The collimated beam is reflected by a prism 4, and is then incident on an object lens 5. The object lens 5 is movable in a focus direction 6 and a tracking direction 7 by an actuator (not shown), and focuses a small light spot on a disk 9. A magnetooptical recording layer is formed on the disk 9. A direction of an arrow 10 corresponds to a direction of tracks, and an arrow 11 indicates the center of rotation of the disk. The prism 4, the object lens 5, the actuator, and the like are fixed on a carriage 13, and the carriage 13 can be moved in a radial direction of the disk 9 using a linear motor (not shown), and the like.

Light reflected by the disk 9 is converted to a collimated beam by the object lens 5, and is deflected by the prism 4 toward the polarization beam splitter 3. The light beam is then reflected by the polarization beam splitter 3 toward a direction of a detection optical system, and is split by a beam splitter 16 through a focusing lens 15 into a light beam reflected toward a servo sensor 18 and a light beam transmitting toward radio frequency (RF) sensors 19 and 20.

The focusing lens 15 includes an element for generating, e.g., an astigmatism, and the light beam is focused on the servo sensor 18. The servo sensor 18 comprises four-split sensors 18-1 to 18-4. The servo sensor 18 is aligned in directions of three axes while observing that a light spot is focused on a predetermined track on the disk 9. The sensor 18 is then adjusted to obtain equal outputs from the four sensors.

The light beam transmitting through the beam splitter 16 is split into two beams by a polarization beam splitter 17, and the two beams are respectively focused on the RF sensors 19 and 20. The semiconductor laser 1, the collimator lens 2, the RF sensors, and the like are fixed to a head fixing unit 14. The magnetooptical disk apparatus shown in FIG. 1 employs a so-called divided optical system which is divided into the carriage 13 and the head fixing unit 14, and can allow high-speed access.

An actuator unit of the magnetooptical disk apparatus will be described below with reference to FIG. 2.

In FIG. 2, the object lens 5 is fixed to a bobbin 21. A tracking coil 22 and a focusing coil 23 drive the bobbin 21 in the tracking and focus directions 7 and 6 in cooperation with a tracking magnet 24 and a focusing magnet 25 fixed to a yoke 26. The bobbin 21 is supported by a support shaft 27. An under limiter 28 determines the lowermost end of the bobbin. A counterweight 29 of the object lens 5 is fixed to the bobbin.

A light-emitting diode 30 is fixed to a flexible printed board 31. A light beam emitted from the light-emitting diode 30 is shaped via a slit 32, and the shaped light beam is projected onto a 2-split sensor 34 as a light beam 33. The light-emitting diode 30 is fixed to the bobbin 21. When the actuator is shifted in the tracking direction, amounts of the light beam 33 incident on light-receiving surfaces 34-1 and 34-2 of the 2-split sensor are changed, and the outputs from these surfaces can be calculated to detect a position of the object lens 5. The 2-split sensor 34 is connected to a flexible printed board 35.

A linear motor unit of the magnetooptical disk apparatus will be described below with reference to FIG. 3.

In FIG. 3, an actuator including the object lens 5, the bobbin 21, the magnet 24, the yoke 26, and the bobbin support shaft 27 is fixed on the carriage 13. The carriage 13 is supported on rails 36-1 and 36-2 through, e.g., bearings 37-1 and 37-2, and is movable in a disk radial direction 12. The linear motor unit comprises a coil 38, a yoke 39, magnets 40-1 and 40-2, and the like. In this case, linear motors are attached to two sides of the carriage to allow high-speed access. A spindle motor 41 rotates the disk.

A servo system for the magnetooptical disk apparatus described above with reference to FIGS. 1 to 3 will be described below with reference to FIG. 4.

The servo sensor 18 is adjusted to obtain equal outputs from the four sensors 18-1 to 18-4 when the object lens 5 is located at the center of a light beam from the semiconductor laser 1 and the light beam forms a small spot of about 1 micron on a track of the disk 9. In this case, since a focus error detection method employs an astigmatism method, if the outputs from the sensors 18-1 to 18-4 are represented by $S_1$ to $S_4$, a difference between outputs of diagonal sums is observed, thus obtaining a focus error signal $S_{AF}$ given by:

$$S_{AF} = (S_1 + S_3) - (S_2 + S_4)$$

For example, when a light spot is in an in-focus state on the disk, the above-mentioned output becomes 0. When the light spot is in a near-focus state on the disk, a negative output is obtained; when the light spot is in a far-focus state, a positive output is obtained.

A tracking error detection method employs a push-pull method. In the push-pull method, a balance of diffraction light from a guide groove of a disk is observed in a far field. A distribution of diffraction light is unbalanced according to a radial position shift between a predetermined track on a disk and a light spot. Thus, a difference between outputs of the sensors divided by a dividing line along a tangential direction of the sensor 18 is observed, and a tracking error signal $S_{AT}$ given by the following equation is obtained:

$$S_{AT}=(S_2+S_3)-(S_1+S_4)$$

For example, when the light spot is located on a track, the output is zero. When the light spot is shifted in an inner peripheral direction of the disk, a negative output is obtained; when the light spot is shifted in an outer peripheral direction of the disk, a positive output is obtained.

In the push-pull method, when the object lens 5 is largely shifted in a radial direction (tracking direction) by, e.g., a multi-track jump mode, since the light beam focused on the servo sensor 18 is moved in the radial direction, an auto-tracking (to be abbreviated to as AT hereinafter) output is offset in addition to an unbalanced distribution of diffraction light according to the above-mentioned track shift. In order to perform high-speed access, it is advantageous that the object lens can be used to be moved by about 100 to 150 tracks from the center of a light beam from the semiconductor laser 1. Since this offset almost corresponds to a shift amount of the object lens from the center of light beam, it can be easily corrected as long as the object lens position can be detected.

In this case, the object lens position detection means (to be referred to as a lens sensor hereinafter) as described in FIG. 2 is arranged. The outputs from the two sensors 34-1 and 34-2 are respectively represented by $S_{LP1}$ and $S_{LP2}$, and these outputs are adjusted so that a lens position (to be abbreviated as LP hereinafter) output $S_{LP}$ given by the following equation becomes 0 when the object lens is located at the center of light beam:

$$S_{LP}=S_{LP1}-S_{LP2}$$

When the object lens 5 is located at the center of the light beam, the above-mentioned output becomes 0. However, when the object lens is shifted in an inner peripheral direction of the disk, a positive output is obtained; when it is shifted in an outer peripheral direction of the disk, a negative output is obtained.

Since the LP sensor output represents a position shift between the carriage 13 and the object lens 5, a linear motor can be driven using this data, so that the object lens position can always be kept at the center of the light beam.

The servo sensor and the like have been described. However, it is impossible to perfectly mechanically align these components. When conventional analog servo signal processing is performed, a sensor output is normally electrically adjusted by a control volume (not shown) after mechanical adjustment.

Servo signal processing will be briefly described below.

The outputs $S_1$ to $S_4$ from the servo sensor 18 are amplified by a preamplifier 43, and then are output from an arithmetic unit 44 as AT and auto-focus (to be abbreviated to as AF hereinafter) outputs, as described above. The outputs $S_{LP1}$ and $S_{LP2}$ from the LP sensor 34 are amplified by a preamplifier 45, and then are output from an arithmetic unit 46 as the LP output. Of these outputs, the AT and LP outputs are added to each other by an adder 47 to be corrected, so that the tracking error signal is not offset even if the object lens position is shifted (corrected AT output). The AF output, the corrected AT output, and the LP output are supplied to a digital signal processing circuit 48, and are then output respectively to AF, AT, and linear motor drivers 49, 50, and 51 at proper timings. These drivers output drive signals to the AF, AT, and linear motor coils 23, 22, and 38, respectively, thus executing focus control and tracking control.

An RF system will be described below with reference to FIG. 5.

The RF system shown in FIG. 5 includes the RF sensors 19 and 20 described above. Preamplifiers 52 and 53 respectively amplify outputs from the RF sensors 19 and 20. Amplifiers 54 and 55 calculate a difference and a sum of the outputs from the RF sensors 19 and 20. A magnetooptical signal output 56 is detected as a difference between the outputs from the RF sensors 19 and 20 in such a manner that rotation of a plane of polarization of a light beam caused by a magnetooptical effect is detected by the polarization beam splitter 17. A preformat signal 57 representing, e.g., a sector mark or an address corresponds to a linear increase/decrease in light amount incident on the RF sensors 19 and 20, and is detected as a sum of the outputs from the RF sensors 19 and 20.

A magnetooptical disk will be described below with reference to FIG. 6.

In FIG. 6, tracks 58 and guide grooves 59 are concentrically or spirally arranged to have a disk center 11. Each track is divided into header areas in each of which preformat signals such as sector marks and addresses are recorded in advance in the form of pits 60, and data areas in each of which magnetooptical signals are recorded by a user in the form of magnetooptical pits 61.

In the magnetooptical disk apparatus with the above-mentioned arrangement, since sensor outputs are electrically adjusted by, e.g., an adjusting volume, this results in a cumbersome operation, and it is difficult to reduce manufacturing cost of an apparatus.

Since the above focus or tracking error detection method does not directly detect a focusing state of a light spot on a disk, when a relative position between the servo sensor and a light spot on the servo sensor or a position of the semiconductor laser is shifted by any external force after adjustment, the light spot can no longer be correctly focused on a predetermined track. These changes in states may often occur due to a change in temperature or a vibration during transportation, and servo precision is impaired. Even when the position sensor itself does not suffer from a position shift, the wavelength of the semiconductor laser may be changed due to a change in temperature. As a result, a deflection angle of a light beam in the polarization beam splitter with the beam shaping function is changed, and a light spot position on the servo sensor is undesirably moved.

An AT offset which occurs when the center of the object lens is shifted from an optical axis in a so-called multi-track jump mode wherein the object lens is moved in the tracking direction to move a light beam to another track separated from the present track by several tracks is changed due to a variation in depth of the guide groove. Therefore, this results in degradation of tracking precision unless an offset value is adjusted every disk.

Japanese Laid-Open Patent Application No. 53-129604 discloses an optical information processing apparatus which can automatically correct an AF offset.

SUMMARY OF THE INVENTION

The present invention has been made in consideration of the above problems, and has as its object to provide an optical information processing apparatus which is free from complicated adjustment processes, and can automatically correct a position shift of optical parts, and the like. The present invention is suitable for digital control, and can simultaneously attain cost down and improvement of servo precision, which cannot be attained by conventional analog control.

In order to achieve the above object, according to the present invention, there is provided an optical information processing apparatus comprising:

means for scanning a track formed on an optical recording medium with a light beam;

tracking control means for correcting a position shift between a radiation position of the light beam on the medium and the track; and means for automatically correcting an offset of the tracking control means.

According to the present invention, a focus control means for correcting a disk surface displacement is calibrated so that an optimal offset for focusing a light spot on an optical disk is added to a focus error signal, and its focus gain is also calibrated to obtain optimal servo stability. A first tracking control means for correcting a small disk eccentricity at a relatively high frequency is calibrated so that an optimal offset for precisely tracking a light spot on a predetermined track position is added to a tracking error signal, and its tracking gain is calibrated to obtain optimal servo stability. A means for, when an object lens for focusing a light spot is shifted from an optical axis in a tracking direction, detecting the position of the object lens is calibrated by counting the number of tracks of a given disk. In order to correct a tracking error occurring when the object lens is shifted from the optical axis in the tracking direction, the relationship between the object lens position and the offset value of the tracking error signal is calibrated by counting the number of tracks of a given disk. A gain of a second tracking control means for correcting a large disk eccentricity at a low frequency or moving an object lens position in a radial direction of a disk is calibrated to obtain optimal servo stability using a given disk and the object lens detection means.

An optical information processing apparatus employing an automatic control device for a servo system according to the present invention comprises an optical disk loading detection means, and executes the above-mentioned calibration operations every time a new disk is loaded. The optical information processing apparatus using an automatic servo adjustment method of the present invention comprises a temperature detection means. When a change in temperature exceeding a predetermined value occurs and servo precision is in doubt, new calibration operations are executed using the given optical disk as described above. The above-mentioned operations can be easily attained by using a digital processing circuit.

BRIEF DESCRIPTION OF THE DRAWINGS

FIG. 1 is a schematic perspective view for explaining an optical system of a magnetooptical disk apparatus;

FIG. 7 is a key to reconstruction of FIGS. 7A and 7B;

FIGS. 7A and 7B are a block diagram showing an embodiment of a control circuit used in an optical information processing apparatus according to the present invention;

FIG. 19 is a key to reconstruction of FIGS. 19A and 19B;

FIGS. 19A and 19B are a chart for explaining the second embodiment of a method of adjusting an AF gain according to the present invention;

FIG. 20 is a chart for explaining linearity correction of a laser power monitor according to the present invention.

DETAILED DESCRIPTION OF THE PREFERRED EMBODIMENTS

Figure 2:
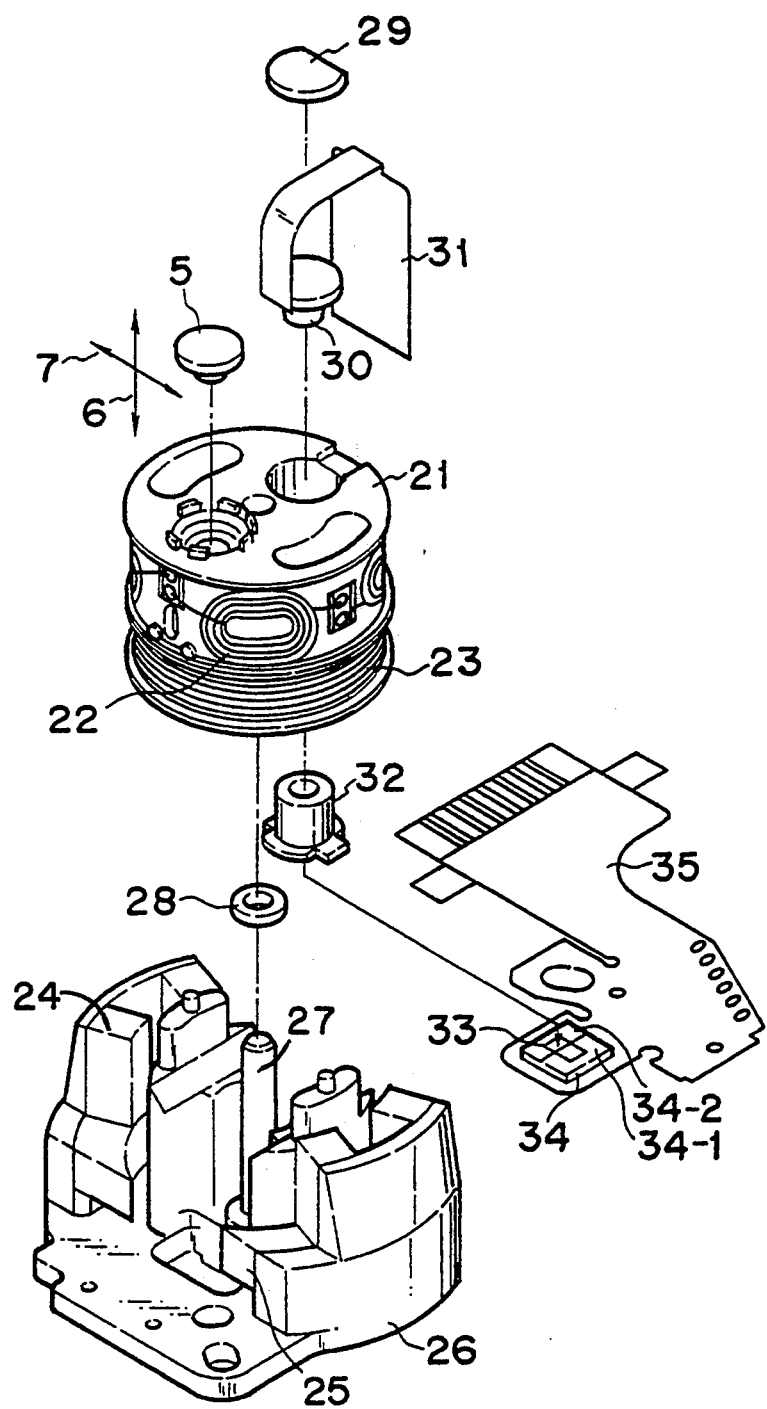
FIG. 2 is an exploded perspective view for explaining an actuator of the magnetooptical disk apparatus.
Figure 3:
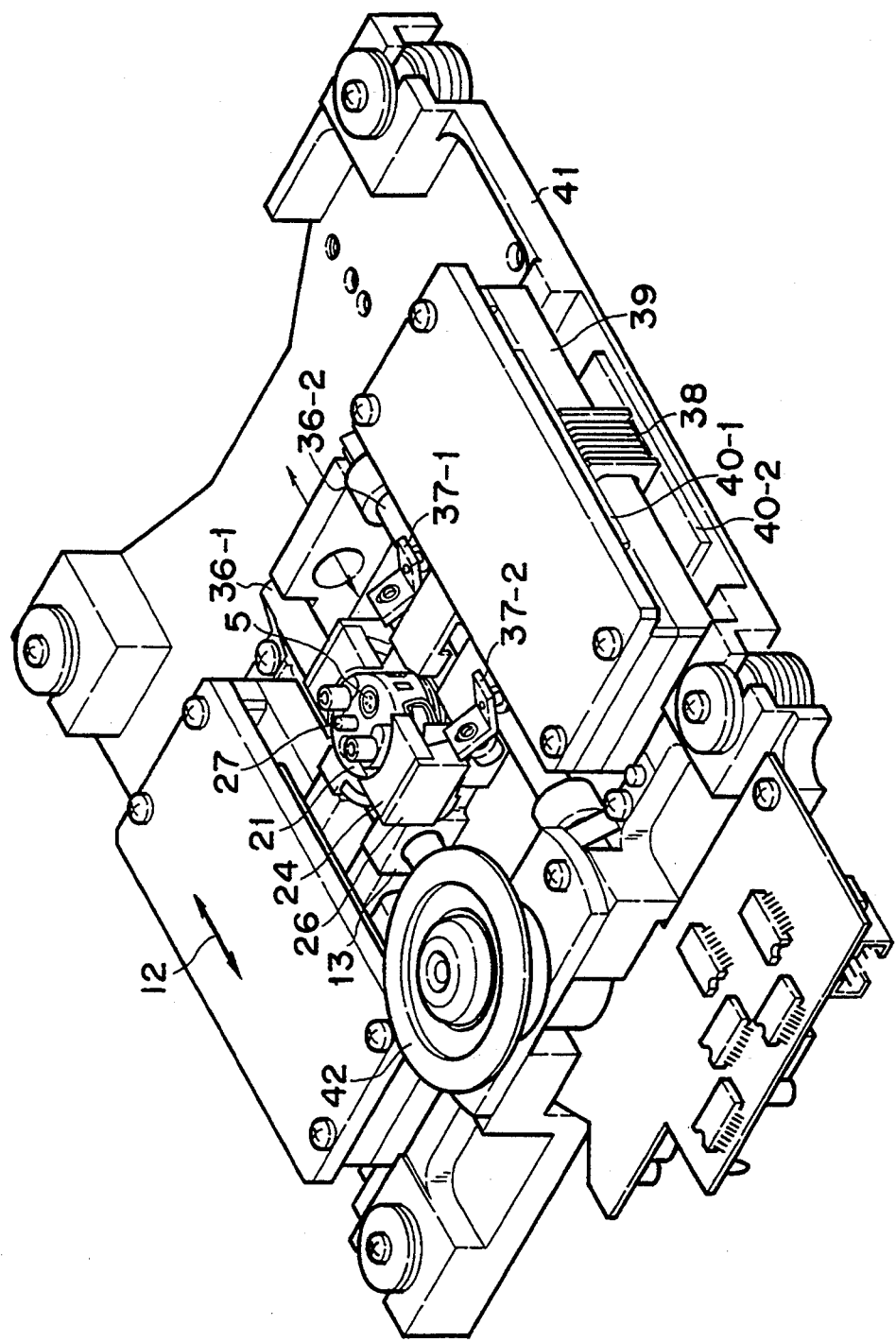
FIG. 3 is a schematic perspective view for explaining a linear motor of the magnetooptical disk apparatus.
Figure 4:
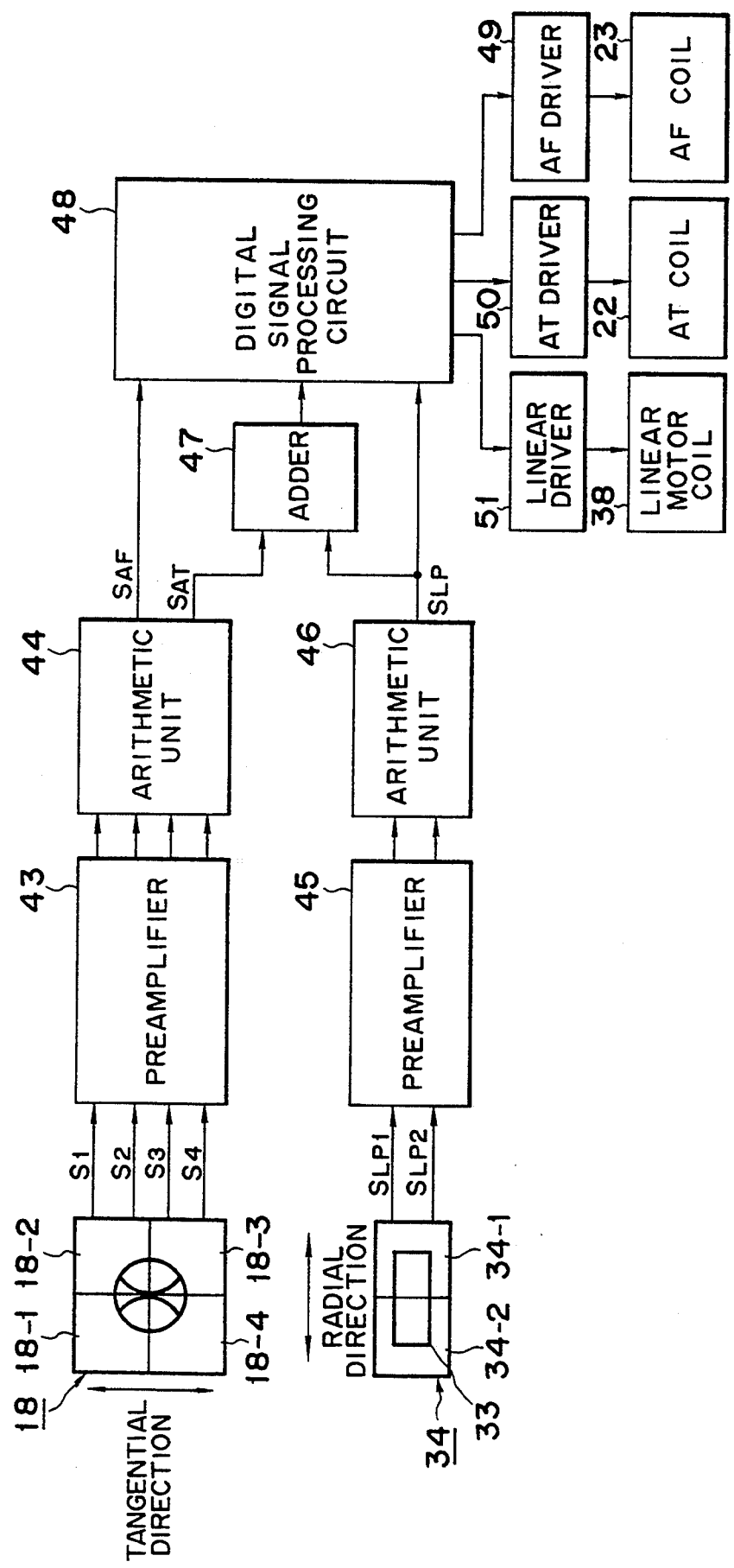
FIG. 4 is a block diagram for explaining a servo system of the magnetooptical disk apparatus.
Figure 5:
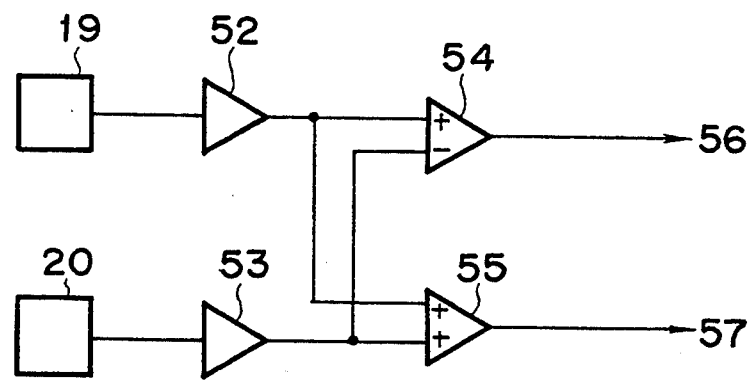
FIG. 5 is a block diagram for explaining an RF system of the magnetooptical disk apparatus.
Figure 6:
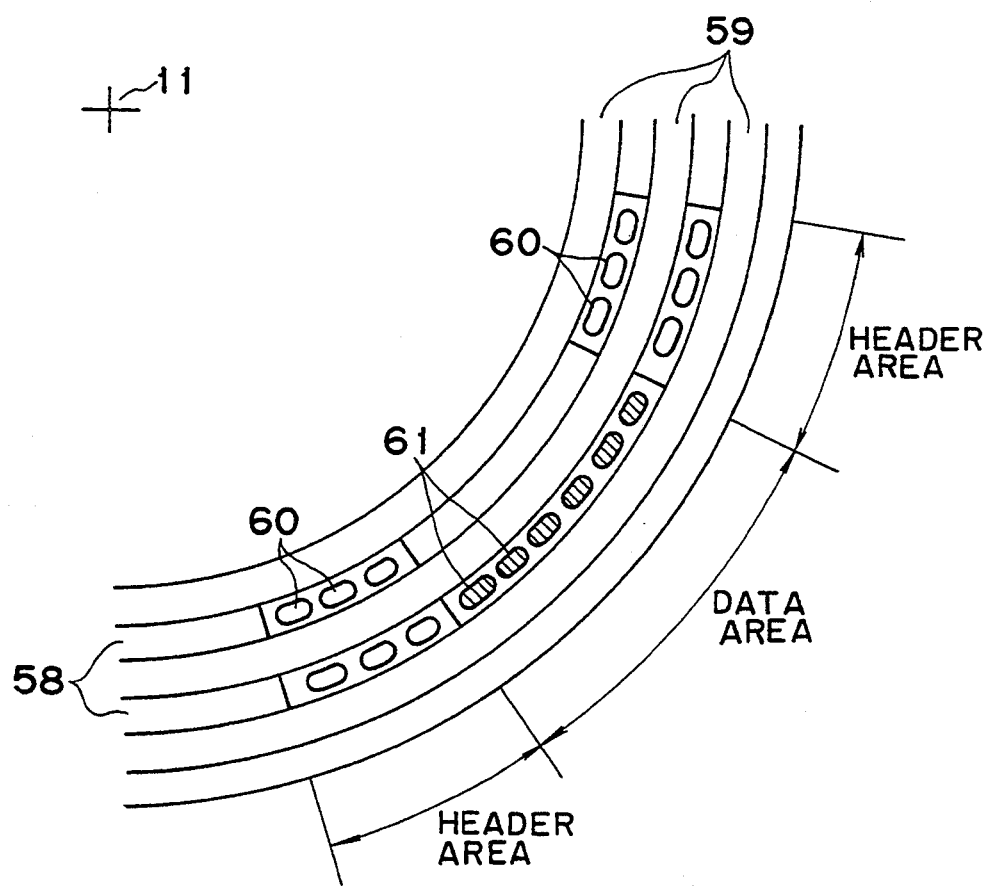
FIG. 6 is a schematic plan view for explaining an arrangement of the magnetooptical disk apparatus.
Figure 7B:
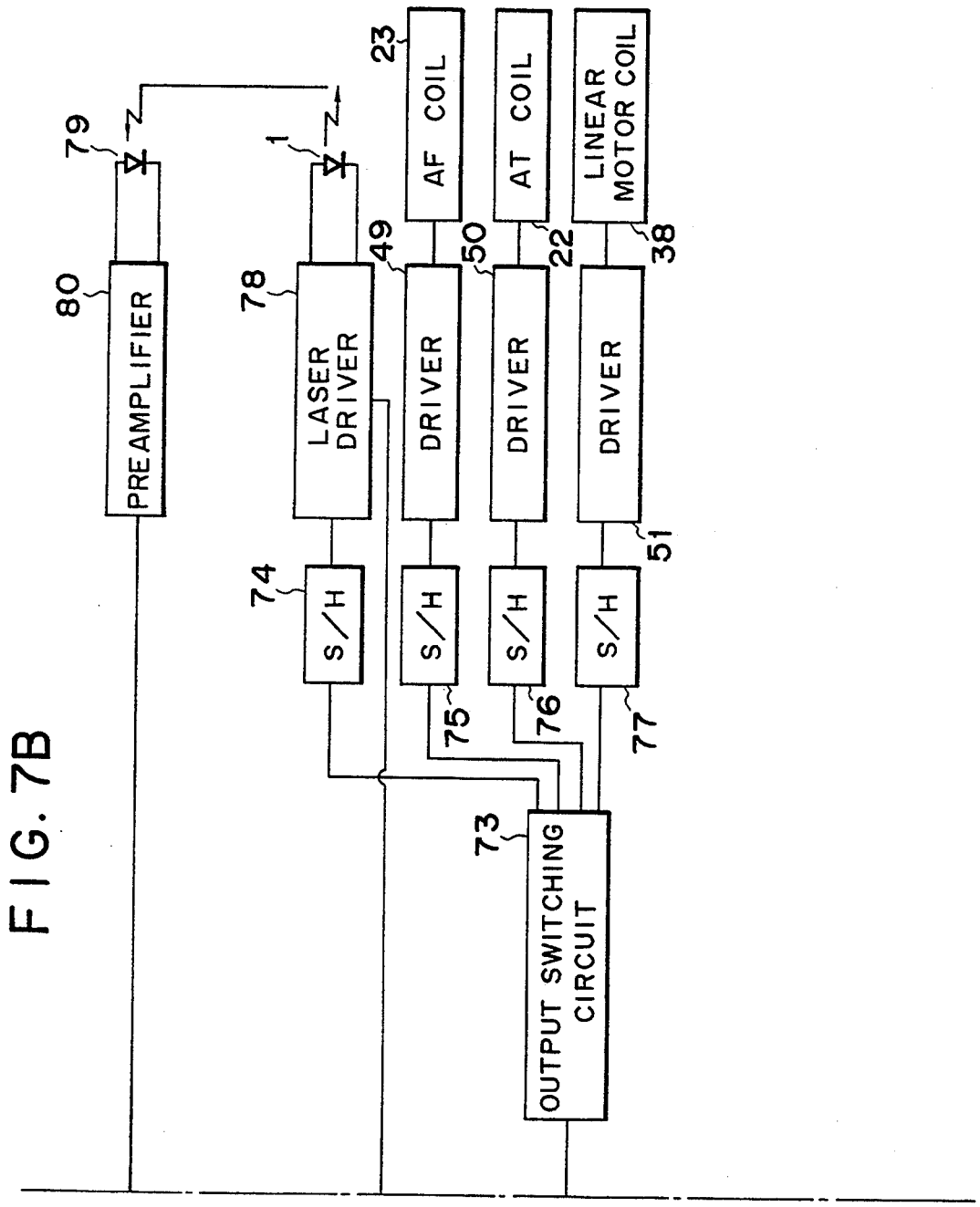

FIG. 7 is a block diagram showing an embodiment of a control circuit used in an optical information processing apparatus according to the present invention.

The apparatus of the present invention is substantially the same as that described with reference to FIGS. 1 to 6 except for this circuit.

A servo sensor 18, a preamplifier 43, and an arithmetic unit 44 are connected as shown in FIG. 7. The arithmetic unit 44 is connected to a digital signal processing circuit 48 via an input switching circuit 62 and an A/D (analog-to-digital) converter 63. The arithmetic unit 44 is also connected to a track counter 64. The output of the track counter 64 is connected to the digital signal processing circuit 48. A lens position sensor 34 is connected to the input switching circuit 62 via a preamplifier 45. The output of a home position sensor 65 is connected to the digital signal processing circuit 48. A CPU (central processing unit) 66 is bidirectionally connected to the digital signal processing circuit 48 and an external interface 67. A spindle motor 42 for rotating a disk is connected to the digital signal processing circuit 48 via a motor driver 68. Two RF sensors 19 and 20 are connected to an RF signal processing circuit 69 via preamplifiers 52 and 53. One output of the RF signal processing circuit 69 is connected to the input switching circuit 62 via a detector 70, and the other input thereof is connected to the digital signal processing circuit 48. A memory 71 for storing various data is connected to the digital signal processing circuit 48. The digital signal processing circuit 48 is connected to a laser diode 1, a focus coil (AF coil) 23, a tracking coil (AT coil) 22, and a linear motor coil 38 through a D/A (digital-to-analog) converter 72 and an output switching circuit 73, four sample & hold (S/H) circuits 74, 75, 76, and 77, and then drivers 78, 49, 50, and 51. A monitor photodiode 79 for monitoring light emitted from the laser diode is connected to the input switching circuit 62 via a preamplifier 80. A temperature sensor 81 for detecting a temperature in the apparatus is connected to the input switching circuit 62.

The basic operation of the circuit shown in FIG. 7 will be described below.

A light beam incident on the servo sensor 18 is converted into a voltage signal by the preamplifier 43. Thereafter, a focus error signal, a tracking error signal, and a focus/tracking sum signal are calculated by the arithmetic unit 44 based on the voltage signal. One of these signals is selected by the input switching circuit 62, and the selected signal is converted into a digital signal by the A/D converter 63. The digital signal is input to the digital signal processing circuit 48. The digital signal processing circuit 48 outputs a digital control value to the D/A converter 72 to control the AT and AF coils so that tracking and focus error levels become zero. An analog control signal output from the D/A converter 72 is selected by the output switching circuit 73, and is then held by the S/H circuits 75 and 76. Thereafter, the held signals are output to the drivers 49 and 50. The drivers 49 and 50 respectively drive the AF and AT coils 23 and 22.

In order to read/write a magnetooptical signal, a laser beam must be radiated on a disk. The digital signal processing circuit 48 outputs a laser beam control value to the D/A converter 72. The analog-converted signal is selected by the output switching circuit 73, and is then input to the laser driver 78 via the S/H circuit 74. The laser driver controls the laser diode 1 so that a light amount necessary for read/write access can be obtained. The monitor photodiode 79 for monitoring light emitted from the laser diode is attached to the laser diode, and the output from the photodiode 79 is input to the input switching circuit 62 via the preamplifier 80. Since the light amount is monitored by the monitor photodiode 79, the digital signal processing circuit 48 can accurately control a laser output light amount. A signal line directly connected from the digital signal processing circuit 48 to the laser driver 78 is a high-speed laser ON/OFF signal line used in a write mode.

The lens position (LP) sensor 34 comprises a 2-split photodiode, and is irradiated with light emitted from an LP sensor light-emitting diode (LED) 30. An output from the photodiode is changed upon a change in object lens position. This output is amplified by the preamplifier 45, and the amplified signal is input to the input switching circuit 62. The signal is then input to the digital signal processing circuit 48 via the A/D converter 63. An output from a home position sensor 65 for detecting that an actuator is moved to a home position on an outer periphery side is input to the digital signal processing circuit 48.

The CPU 66 for managing the overall sequence operation according to the present invention is connected to the digital signal processing circuit 48 to control the operation of the circuit 48. The CPU 66 is also connected to the external interface 67 to manage data exchange with an external device.

The memory 71 stores various data supplied from the digital signal processing circuit 48 or the CPU 66 via the circuit 48.

Rotation of the spindle motor 42 is controlled by the motor driver 68. The start and stop operations of the spindle motor 42 are controlled by the CPU 66 via the digital signal processing circuit 48.

The linear motor coil 38 is driven through the driver 51 in response to a speed command from the digital signal processing circuit 48. When the linear motor is started, the tracking error signal from the arithmetic unit 44 appears as a track crossing signal. The number of tracking signals during movement of the linear motor is counted by the track counter 64 to detect a moving track count. The digital signal processing circuit 48 calculates a target moving speed, and the like on the basis of a target track count and a present track count.

The two RF sensors 19 and 20 convert a magnetooptical signal and a preformat signal into electrical signals. These signals are amplified by the preamplifiers 52 and 53, and the amplified signals are then subjected to difference detection, in-phase detection, and peak detection processing operations in the RF signal processing circuit 69. The output from the RF signal processing circuit 69 is processed, as digital data, by the CPU 66 via the digital signal processing circuit 48, and the processed signal is output, as digital information, to the external device via the external interface 67. On the other hand, the envelope of the signal subjected to the RF signal processing is detected by the detector 70 as an analog signal, and the signal is then input as a signal indicating a magnitude level to the digital signal processing circuit 48 via the input switching circuit 62 and the A/D converter 63. This signal is used to judge the magnitude of the RF signal level and to detect whether or not focus and tracking operations are normally executed.

Figure 8:
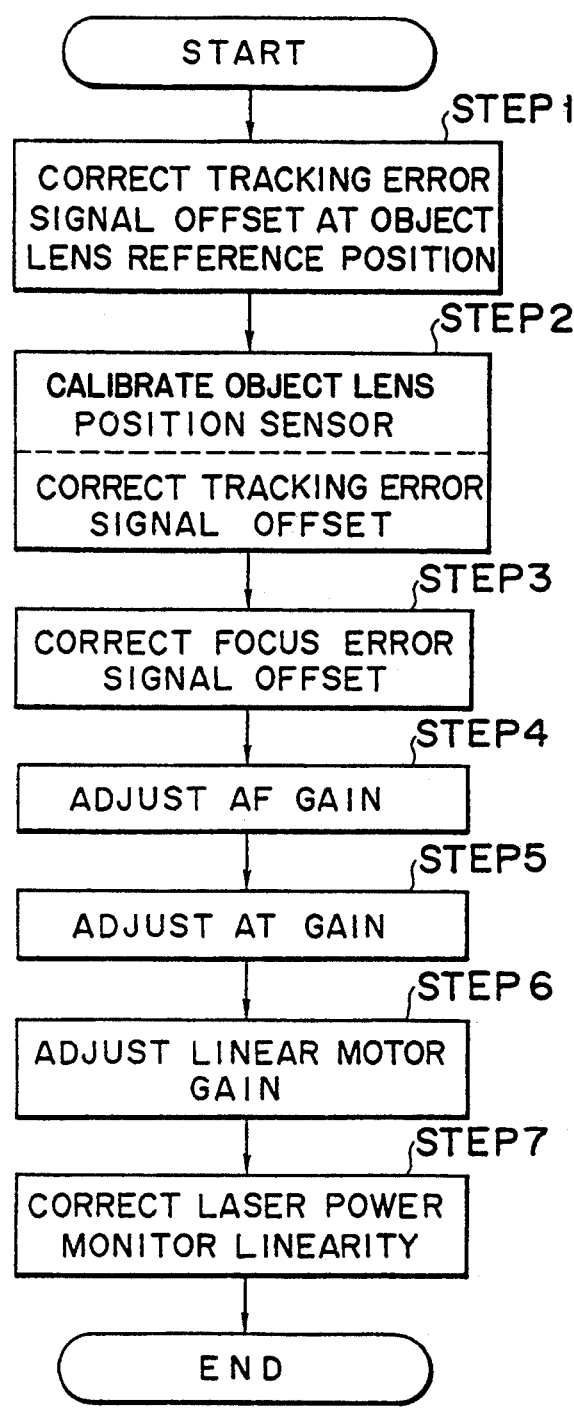
FIG. 8 is a flow chart showing an automatic control sequence in the apparatus according to the present invention.

FIG. 8 shows an automatic control sequence of the servo system in the apparatus of the present invention.

First, the object lens is positioned at the center of a light beam from the semiconductor laser, and only the AF servo is operated. Then, an offset value of a tracking error signal is measured and corrected (step 1). The offsets to be corrected at this time include an alignment error upon adjustment of, e.g., the servo sensor, a position shift after adjustment, warp of a disk, and the like.

Next, the object lens position sensor is calibrated, and a tracking error signal offset when the object lens is shifted from the center of the light beam is corrected (step 2). These two operations can be performed at the same time but may be performed independently. The object lens position sensor output is calibrated based on an absolute object lens position from the center of light beam which is detected by counting the number of tracks of the disk. Thus, linearity of the object lens position sensor is corrected.

Correction of the tracking error signal offset executed when the object lens is shifted from the center of the light beam is performed to correct linearity between the object lens position and the offset value of the tracking error signal, which occurs due to the causes described in step 1. At the same time, a variation in offset caused by a variation in, e.g., depth of the guide groove of the disk is corrected.

A focus error signal offset is then corrected (step 3). This step may be executed before step 2. The AF and AT servo operations are performed and an offset value is determined to maximize reproduction amplitudes of preformat signals (e.g., sector marks, address signals, and the like) of the disk. Thus, an AF offset caused by an alignment error upon adjustment of, e.g., the servo sensor, variations in thickness and refractive index of a disk substrate, a variation in guide groove of the disk, and the like can be corrected.

Then, an AF gain is adjusted (step 4). The AF and AT servo operations are performed to add a proper focus disturbance from the digital processing circuit, and a response thereto is measured, thereby adjusting the gain to a predetermined value. Initial and aging variations of the actuator, variations in disk, and the like can be corrected at the same time.

An AT gain is adjusted in the same manner as in step 4 (step 5).

A linear motor gain is adjusted (step 6). The AF and AT servo operations are performed on a predetermined track to add a proper disturbance from the digital signal processing circuit to the linear motor, and a response from the linear motor is measured using the object lens position sensor calibrated in step 2. Initial and aging variations of the linear motor can be corrected.

Finally, laser power monitor linearity is corrected based on the monitor photodiode incorporated in the semiconductor laser (step 7). Since the magnetooptical disk apparatus uses a laser power by changing it to have a difference of about 10 times between a data reproduction mode and data erase and write modes, the monitor linearity is impaired by light reflected by the disk. Thus, the poor linearity can be corrected by the output from the servo sensor. Thus, a recording/reproduction operation with an optimal laser power can be performed.

The correction methods in respective steps will be described in detail below.

METHOD OF CORRECTING TRACKING ERROR SIGNAL OFFSET AT OBJECT LENS REFERENCE POSITION (ON OPTICAL AXIS)

In order to prevent already recorded data from being erased during correction, the carriage is moved to its home position. The home position sensor 65 comprising, e.g., a photointerrupter, and a mechanical switch shown in FIG. 7 can detect whether or not the carriage is moved to the home position. The object lens is then moved to the central position of a light beam from the semiconductor laser (to be referred to as a lens reference position hereinafter). As a method of attaining this operation, when a focus actuator is moved downward to a lowermost point, a mechanical pin may be engaged at a central point. Alternatively, the output from the preamplifier 45 of the LP sensor 34 is adjusted in advance to have a predetermined value at the lens reference position in the manufacture, and the lens position may be electrically moved so that the LP sensor output has the predetermined value.

In this state, a focusing operation is performed to set the lens at a substantially focal point. Then, a tracking error signal upon track crossing is generated by the following methods. In one method, the linear motor coil 38 is energized while the lens is fixed in position at the reference position to vibrate the linear motor. When the linear motor is sinusoidally vibrated, the object lens is vibrated to cross the tracks, and a tracking error signal $((S_2+S_3)-(S_1+S_4))$ can be obtained from the arithmetic unit 44. In the second method, the object lens is slightly vibrated in the tracking direction at the reference position while the linear motor stands still at the home position. In this manner, the tracking error signal including an offset can be obtained near the lens reference position.

Figure 9:
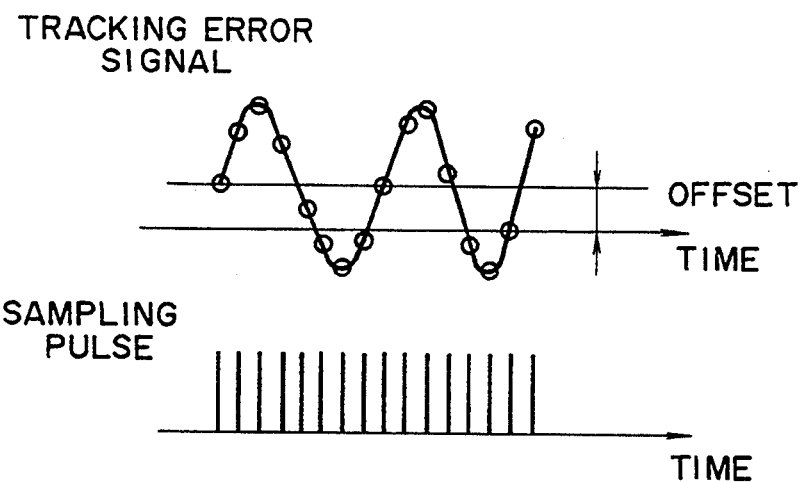
FIG. 9 is a chart for explaining a correction method of an offset value of a tracking error signal used in the present invention.

As shown in FIG. 9, the tracking error signal has an offset component. This signal is a tracking signal output from the arithmetic unit 44, and is A/D-converted based on a sampling pulse shown in FIG. 9 via the input switching circuit 62. Thus, the digital signal is input to the digital signal processing circuit 48. The digital signal processing circuit 48 obtains peak and bottom values from the digital tracking signal, and then obtains an intermediate point of these values, thereby recognizing this point as an offset value. In order to more accurately obtain the peak and bottom values, the tracking error signal is preferably sampled several times. The offset value obtained in this manner is stored in the memory 71. In a tracking operation after correction, the obtained tracking offset value is subtracted from the digital tracking error signal before offset correction, which is obtained from the arithmetic unit 44 via the A/D converter 63 to generate an offset-corrected tracking error signal after offset correction. Then, tracking loop is controlled using the offset-corrected tracking error value.

CALIBRATE OBJECT LENS POSITION SENSOR

Figure 10:
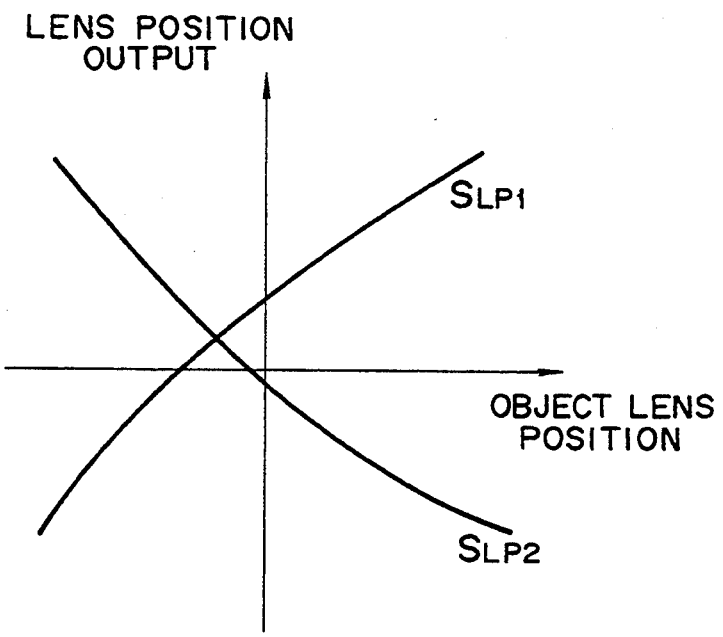
FIG. 10 is a chart showing an output of an object lens position sensor used in the present invention.

The outputs of the lens position sensor 34 have characteristics so that the two sensor outputs $S_{LP1}$ and $S_{LP2}$ change in opposite directions with respect to an object lens position shift, as shown in FIG. 10. Basically, the following arithmetic operation is performed to remove an in-phase fluctuation such as a temperature fluctuation of the sensor output, thus detecting the object lens position:

$$(S_{LP1}-S_{LP2})/(S_{LP1}+S_{LP2})$$

However, since the outputs $S_{LP1}$ and $S_{LP2}$ are not linearly changed with respect to the object lens position, the relationship between the sensor outputs and the object lens position must be detected by the following methods.

First Method

Figure 11:
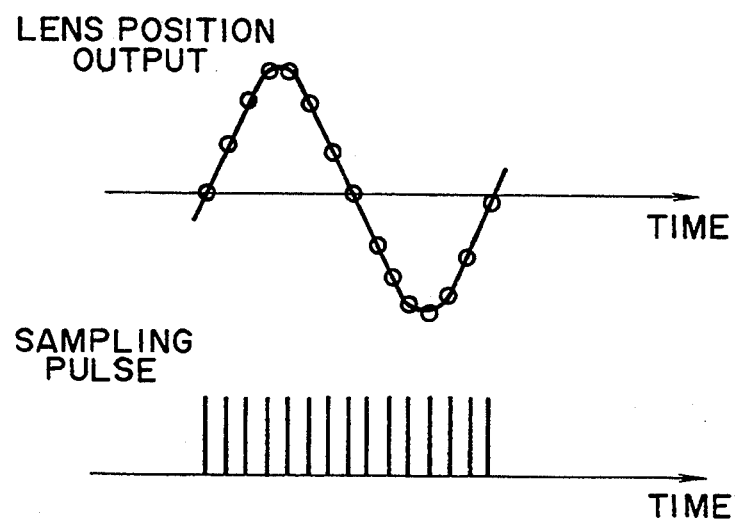
FIG. 11 is a chart for explaining a method of detecting an eccentricity of a disk using the lens position sensor.

The object lens position is set at the center of a light beam from the semiconductor laser, focus servo and tracking servo are set in in-focus and on-track states, and a disk is then rotated. Since the disk suffers from an eccentricity, the tracking actuator fluctuates in the tracking direction to follow the eccentricity, and the two outputs $S_{LP1}$ and $S_{LP2}$ of the lens position sensor 34 vary accordingly. As shown in FIG. 11, the fluctuating outputs $S_{LP1}$ and $S_{LP2}$ are sampled in response to a rotation synchronous sampling pulse which is synchronized with rotation of the disk, and the sampled outputs are converted into digital signals by the A/D converter 63. Thus, eccentricity data during one revolution are stored in the memory 71 via the digital signal processing circuit 48. These data are used to remove an eccentricity component during sampling of the object lens position data (to be described below).

Figure 12:
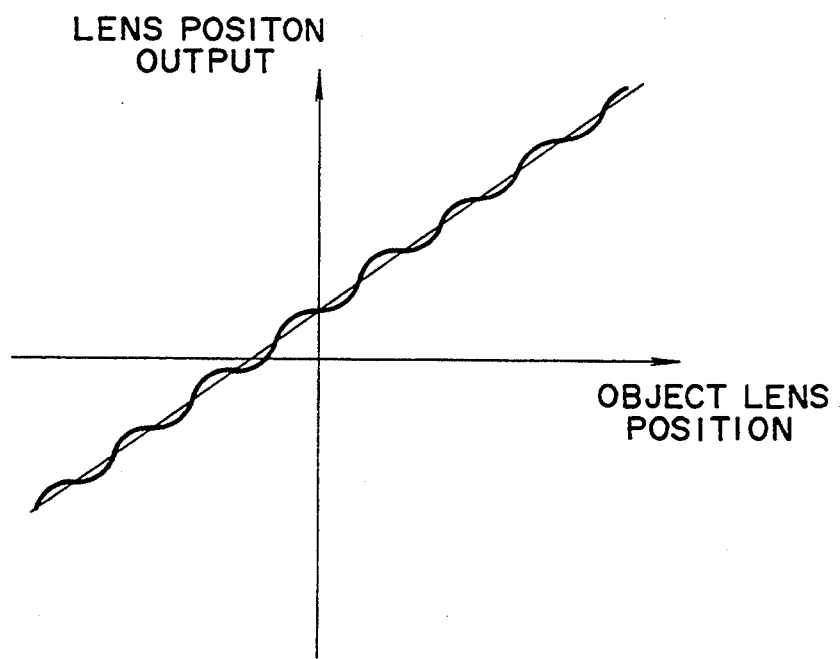
FIG. 12 is a chart for explaining the first embodiment of a method of calibrating a lens position sensor according to the present invention.

A tracking servo loop is then opened to jump the tracking actuator by an object lens moving range (e.g., ±250 microns=±170 tracks). During this operation, data of the relationship between the outputs $S_{LP1}$ and $S_{LP2}$ of the lens position sensor and the object lens position displacement are sampled. While the object lens position is moved from a −170th track position to a +170th track position, the outputs LP1 and LP2 are sampled at every eleventh tracks, and are A/D-converted. The outputs $S_{LP1}$ and $S_{LP2}$ fluctuate under the influence of the eccentricity, as shown in FIG. 12. Thus, data obtained by subtracting the eccentricity component from the sampled data by utilizing the above-mentioned eccentricity data to remove the eccentricity are stored in the memory 71.

Second Method

Figure 13:
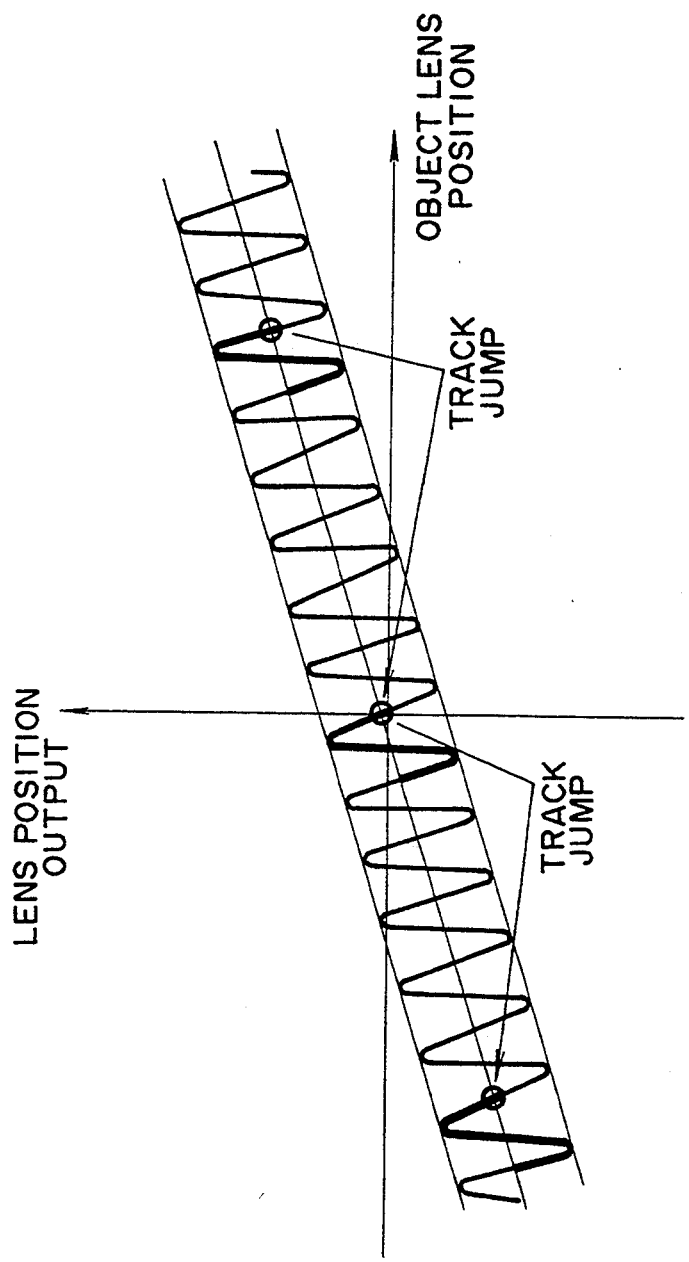
FIG. 13 is a chart for explaining the second embodiment of a method of calibrating a lens position sensor according to the present invention.

In the first method, the object lens position is continuously moved from the −170th track position to the +170th track position, and data are sampled during movement. In this method, however, the object lens position is jumped by several tens of tracks, and the tracking loop is closed to sample data. The same operation as in the first method is executed until the object lens position is brought to the optical central position to enable the tracking loop. In the second method, however, no eccentricity data are sampled. In this method, the object lens position outputs $S_{LP1}$ and $S_{LP2}$ are loaded during one or a plurality of revolutions of the disk, and average values of the outputs $S_{LP1}$ and $S_{LP2}$ are obtained by the digital signal processing circuit 48, thus obtaining the object lens position output from which an eccentricity component is removed. As shown in FIG. 13, a track jump operation is executed by the predetermined number of tracks, and the tracking loop is closed at the object lens position after movement. During one or several revolutions of the disk, the object lens position outputs are loaded, and their average values are obtained, thereby obtaining the object lens position output at that point. In this manner, the track jump operation, data sampling, and average value calculations are repeated, and object lens position output values free from an eccentricity component over the entire object lens moving range are stored in the memory 71.

Third Method

In the first or second method, data sampling is performed while the object lens position is continuously moved or the track jump operation is performed. In this method, data sampling is performed by tracing. The object lens position is jumped inwardly by 170 tracks and the tracking loop is closed. Since the spiral grooves are formed in the disk from its inner periphery toward the outer periphery, the object lens position traces from the inner periphery toward the outer periphery in this state. The object lens position outputs are sampled in every revolution during tracing. In this manner, since data sampling is performed in every revolution, no eccentricity component is caught, and data sampling free from an eccentricity component can be automatically performed.

When data sampling of the relationship between the object lens position and the LP sensor output is completed by any one of the first to third methods and the sampled data are actually used, the object lens position must be obtained from the object lens position outputs. In one method, a conversion table may be allocated in the memory 71. In this case, however, a numerical arithmetic method using a digital signal processor (DSP) or the like which can perform high-speed arithmetic operations will be described below.

Basically, a lens position is approximated by a quintic equation.

$$\text{Position}=A\cdot(X+B\cdot X^2+C\cdot X^3+D\cdot X^4+E\cdot X^5)$$

where X is the normalized object lens position output, and A, B, C, D, and E are constants. That is, we have:

$$X = G \cdot \frac{(S_{LP1} - S_{LP2} \cdot K)}{(S_{LP1} + S_{LP2} \cdot K)}$$

where G and K are constants. G is selected so that the range of X corresponds to ±1.0 when the values of the $S_{LP1}$ and $S_{LP2}$ are substituted. A, B, C, D, and E can be determined based on the values of $S_{LP1}$ and $S_{LP2}$ by the law of least squares so that a position error is minimized. K is used to correct a difference between output levels of $S_{LP1}$ and $S_{LP2}$. When adjustment is performed in advance to yield $S_{LP1}=S_{LP2}$ when the object lens is located at the lens reference position, K=1 can be set.

In this embodiment, the LP sensor detects the position of the object lens in a track crossing direction. However, the present invention is applicable to a case wherein this sensor detects the position of the object lens in an optical axis direction.

CORRECT TRACKING ERROR SIGNAL OFFSET WHEN OBJECT LENS IS SHIFTED FROM REFERENCE POSITION

Since the tracking error offset value and the object lens position displacement have a linear relationship to some extent, it is possible to correct the tracking offset using this relationship. In this case, offset correction is executed in the digital signal processing circuit.

Figure 14:
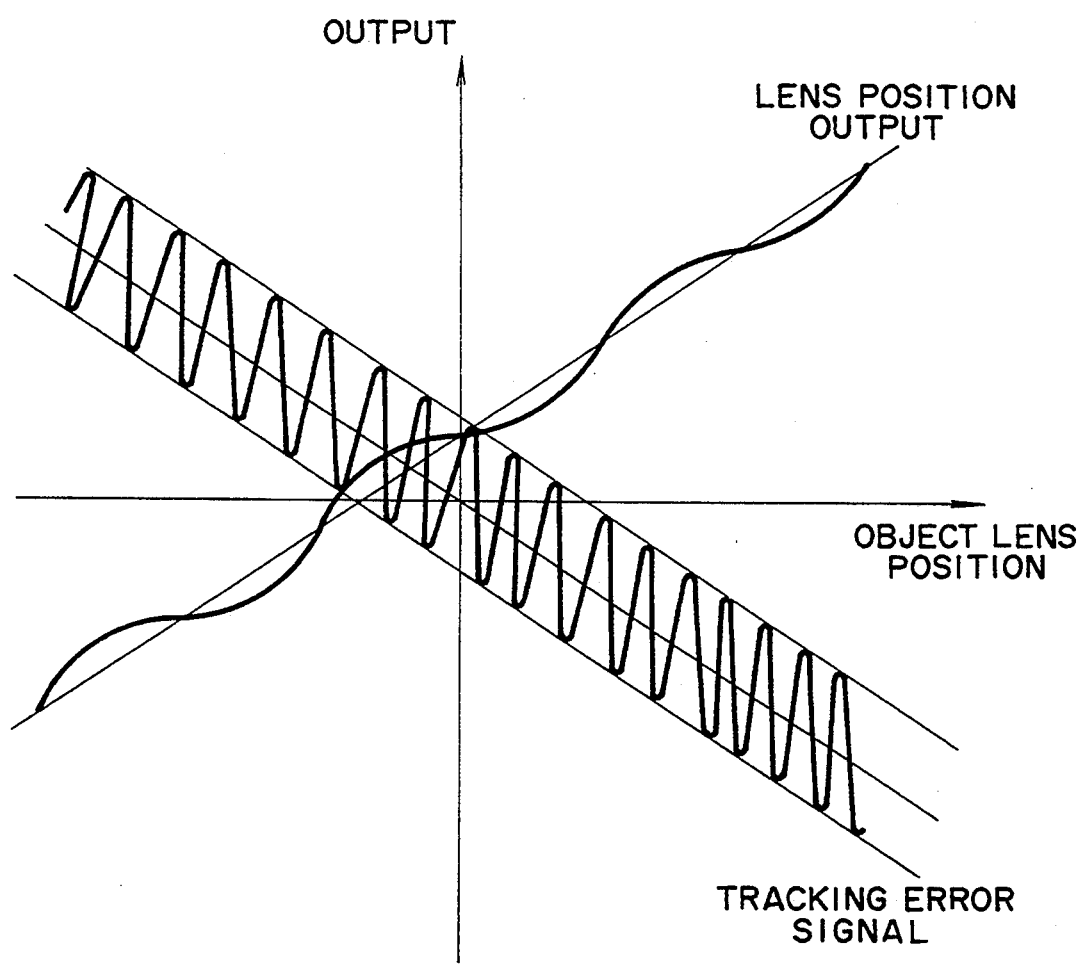
FIG. 14 is a chart for explaining a method of calibrating an offset value of a tracking error signal when an object lens of the present invention is shifted from a reference position.

However, a method of more strictly correcting an offset will be described hereinafter. When data of the relationship between the object lens position and the LP sensor output are sampled, a tracking signal obtained when the object lens is shifted from the reference position in the radial direction is simultaneously observed, and the relationship between the object lens position and the tracking error offset amount is obtained. As shown in FIG. 14, a signal generated upon crossing of tracks is mixed in the tracking error signal. The peak and bottom values of the tracking error signal are read, and their central value is calculated as the tracking error signal. This value may be stored in the memory 71 as a conversion table or an approximation equation described in correction of the lens position sensor may be obtained to numerically calculate the central value using a digital signal processor (DSP) or the like which can perform high-speed arithmetic operations.

The tracking error signal in this case is in a considerably higher frequency range than an eccentricity component. Therefore, a sampling pulse must have a high frequency enough to sufficiently catch peak and bottom values of the tracking error signal. For example, when only an eccentricity component is sampled, the sampling frequency can be about 500 Hz about 10 times the frequency (50 Hz) of the eccentricity component. However, in order to read a signal generated upon crossing of tracks, a sampling pulse having a frequency of about 10 kHz which is 10 times that (about 1 kHz) of the tracking error signal upon crossing of tracks is required.

CORRECT FOCUS ERROR SIGNAL OFFSET

In the first method of correcting a focus error signal offset, an offset value is determined to maximize a reproduction amplitude of a preformat signal (e.g., a sector mask or an address signal) on a disk.

Figure 15:
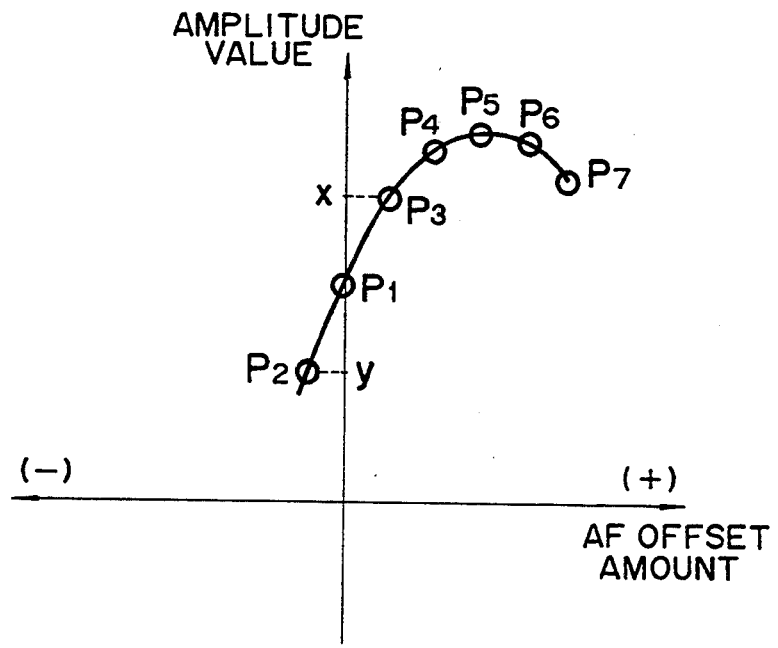
FIG. 15 and FIGS. 16 and 16B are charts for explaining the first embodiment of offset correction of a focus error signal according to the present invention.
Figure 16A:
Figure 16B:
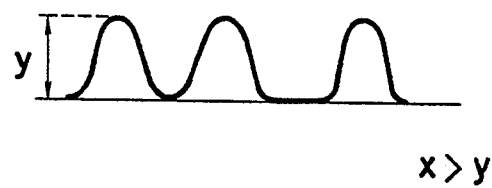

The AF and AT servo operations are performed, and an amplitude value of a signal in a preformat area obtained when an offset is forcibly added to the focus error signal is monitored. This operation will be described below with reference to FIG. 15. In FIG. 15, an AF offset amount is plotted along the abscissa, and an amplitude value of a signal is plotted along the ordinate. Assume that the amplitude of the preformat signal obtained when a predetermined positive offset amount is added (point $P_3$ in FIG. 15) to an initial AF offset position (point $P_1$ in FIG. 15) as the center is a value indicated by x in FIG. 16A, and the amplitude obtained when a negative offset amount is added (point $P_2$ in FIG. 15) is a value indicated by y in FIG. 16B. The two amplitudes x and y are stored in the memory, and are compared with each other. In this case, since x>y, a maximum point of the preformat signal amplitude value, i.e., a just focus point is present on the positive side from the present position.

In FIG. 15, assume that a point defined by adding a predetermined positive offset value to the point $P_3$ is set to be a new central point. Furthermore, the amplitude value of the preformat signal at a point $P_5$ defined by adding a predetermined positive offset value to the point $P_4$ is stored in the memory, and is compared with the stored value of the amplitude of the preformat signal at the point $P_3$. Since the amplitude value at the point $P_5$ is larger than that at the point $P_3$, it is determined that the just focus point is present on the further positive side. In this manner, this operation is repeated to search that the just focus point is present between the points $P_4$ and $P_6$.

The predetermined offset amount is set to be ½ that of the initial value to narrow a search range. The same operation is repeated to have the intermediate point $P_5$ between the points $P_4$ and $P_6$ to converge an offset amount to the just focus point. This operation is continued until a difference from the preformat signal amplitude to be compared becomes zero. The obtained focus offset amount is stored, and is kept applied to the focus error signal. Note that a differentiated signal of the preformat signal using a differential circuit (not shown) is preferably used to improve a detection sensitivity of the just focus point.

As another method of detecting an amplitude value of the preformat signal, the following methods are known.

(a) In this method, photocurrents from the RF sensors 19 and 20 are amplified by the preamplifiers 52 and 53, outputs from these amplifiers are directly monitored, and a peak value at that time is held to detect a DC component.

(b) In this method, the outputs from the RF sensor preamplifiers 52 and 53 are differentiated by a differential circuit (not shown) to detect a peak value of a signal. A p—p value of the differentiated signal is monitored to detect the amplitude value.

(c) In this method, the differentiated signal output is half-wave rectified or full-wave rectified and this peak value is monitored to detect the amplitude value.

(d) In this method, a filter for extracting a certain range where a fluctuation of the AF offset amount considerably appears in a fluctuation of the amplitude value is used, and the output from this filter is monitored.

These amplitude value data are A/D-converted and fetched, and are then processed in the digital signal processing circuit 48.

In the second method, magnetooptical signal data in a data area of the disk is directly fetched, and its amplitude value can be monitored. The sequence of this method is the same as that of the first method.

Figure 17A:
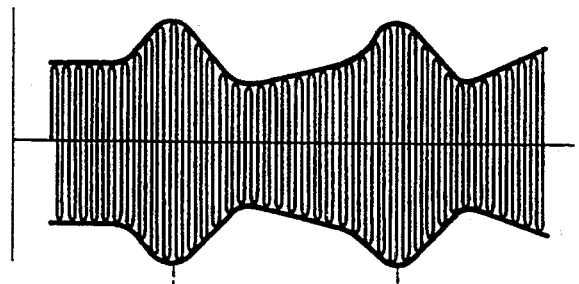
FIGS. 17A and 17B are charts for explaining the second embodiment of offset correction of a focus error signal according to the present invention.
Figure 17B:
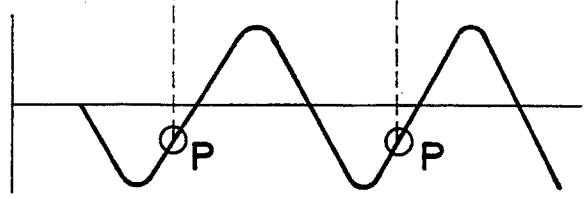

A signal for changing an offset amount, as shown in FIG. 17B, is added to the focus error signal, and the differentiated magnetooptical signal output from a differential circuit, as shown in FIG. 17A, may be monitored. In this case, a voltage value of an AF offset application signal at a position where the amplitude value of the magnetooptical signal is maximized is read (corresponding to a point P in FIG. 17B), and this value is always applied to the focus error signal, thus setting a just focus state.

AUTO FOCUS GAIN CONTROL

Figure 18:
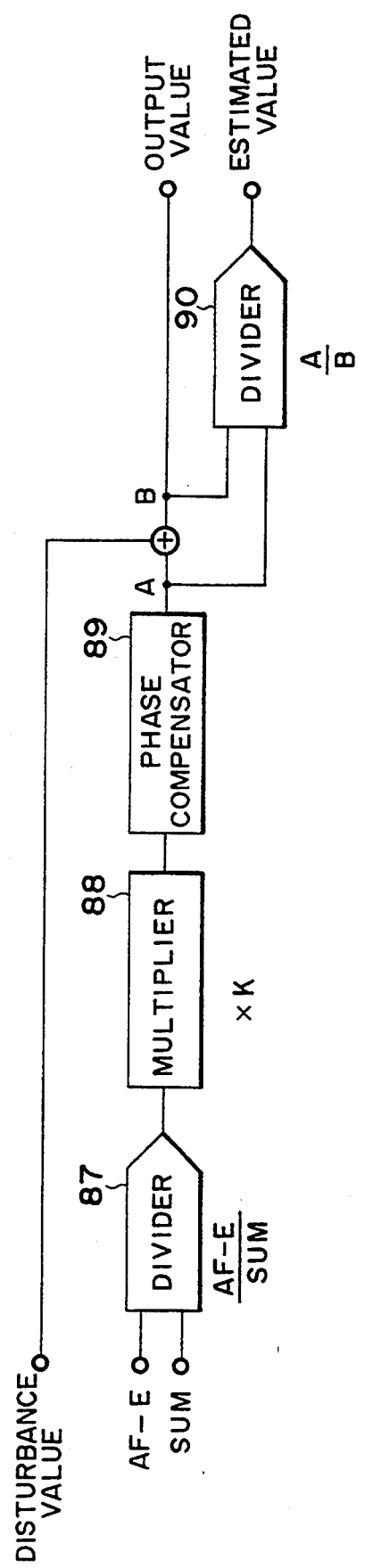
FIG. 18 is a chart for explaining the first embodiment of a method of adjusting an AF gain according to the present invention.

The first method of auto focus gain control will be described below with reference to FIG. 18. FIG. 18 is a pseudo block diagram of a processing sequence in the digital signal processing circuit 48. The AF and AT servo operations are performed to set the object lens at the reference position, and one track is followed or a track tracking state is set. In FIG. 18, the focus error value (an offset has been removed in the above-mentioned process), and a sum signal value are digital data after A/D conversion, and an output value and an estimated value are all digital data. A disturbance value which has the same frequency as a 0-dB crossing frequency of the auto focus loop gain and does not cause an error is given. The amplitude of the disturbance value is given by an increase/decrease in data in the digital signal processing circuit, and its period is also given by (1/crossing frequency). Amplitude data at a node B after application of the disturbance value is compared with amplitude data before application at a node A by a divider 90. When B<A or B>A, a value K in a multiplier 91 is adjusted to yield A=B, thereby adjusting a gain.

Figure 19B:
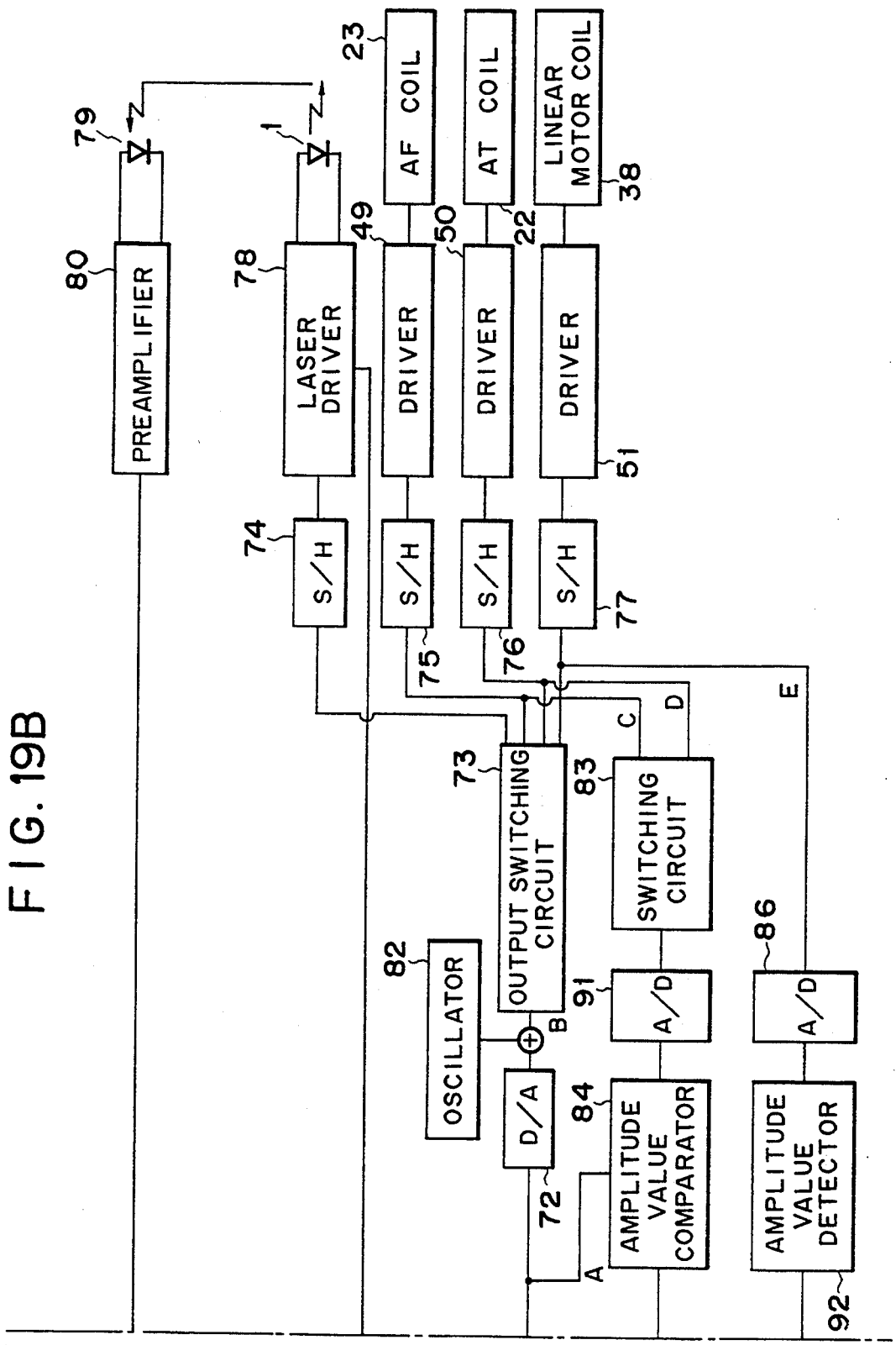

The second method can be executed even when the digital signal processing circuit 48 is limited to a gate array in FIG. 19. An amplitude value B after application of a disturbance from an oscillator 82 is compared with an amplitude value A output from the gate array, and gain control is performed to yield A=B. In this case, C after the output switching circuit 73 may be used in place of B. Read values of A and B have different phases and cannot be read at the same timing. Therefore, one period of a disturbance is sampled to detect amplitude values A and B, and a comparator 84 for comparing these values, and a gain setting circuit 85 for causing the gate array to control the gain are separately arranged.

Gain control may also be performed by applying a disturbance to a signal output from the A/D converter 63 at the input side of the gate array, and comparing the applied amplitude value and an amplitude value after the input switching circuit 62.

AUTO TRACKING GAIN CONTROL

Auto tracking gain control is performed in the same manner as in auto focus gain control.

LINEAR MOTOR GAIN CONTROL

Linear motor gain control is performed as follows. As shown in FIG. 19, a disturbance having the same frequency as a 0-dB crossing frequency in the linear motor loop gain is applied to the linear motor control 38, and a displacement of the linear motor is detected on the basis of the output from the LP sensor.

First Method

A servo operation is performed so that the linear motor is fixed at home position. The focus and tracking servo operations are then performed so that the object lens is located at the reference position. The digital signal processing circuit 48 generates a digital disturbance signal, and applies the disturbance to the linear motor coil via the D/A converter 72, and the like. The linear motor is vibrated by the disturbance. However, since the tracking servo operation is performed, the object lens is vibrated in the radial direction of the disk in correspondence with the movement of the linear motor to maintain tracking. Therefore, the LP sensor also generates an output synchronous with the vibration. Since the linear motor open loop gain is constant except for a mechanical sensitivity of the linear motor, an arithmetic gain can be set so that the displacement of the linear motor has a predetermined value (0 dB at the 0-dB crossing frequency) when a predetermined disturbance amplitude is applied. The digital signal processing circuit 48 reads the output value from the LP sensor, and sets the linear motor servo loop gain so that the read amplitude value has a predetermined value.

Second Method

In this method, a disturbance is generated by the oscillator 82 arranged outside the digital signal processing circuit 48, as shown in FIG. 19. Like in the first method, focus, tracking, linear motor servo operations are performed at the home position. The object lens position is the reference position. In addition, a disturbance frequency is the 0-dB crossing frequency. In this method, the output disturbance signal is fetched by an A/D converter 86, its amplitude is detected by an amplitude value detector 92, and the detected value is estimated by the digital signal processing circuit 48. The displacement of the linear motor is detected based on the LP sensor output like in the first method. The digital signal processing circuit 48 determines an arithmetic gain so that the displacement of the linear motor has a predetermined value (0 dB at the 0-dB crossing frequency) when a predetermined disturbance amplitude is applied. Since this method employs an analog oscillator, an oscillation waveform need not be generated by the digital signal processing circuit. Therefore, a software load can be reduced, and a high frequency can be easily generated.

Third Method

In this method, the object lens is fixed in reference position, and the tracking servo loop is opened. A disturbance is applied to the linear motor to vibrate it, so that the object lens is vibrated in the radial direction of the disk. The number of tracking error signals upon crossing of tracks is counted to detect a displacement amount of the linear motor. The focus and linear motor servo operations are performed at the home position, and the disturbance frequency is the 0-dB crossing frequency like in the first method. In this case, when an eccentricity component is counted, a detected displacement amount suffers from an error. Therefore, it is necessary to count only an eccentricity component beforehand without application of a disturbance, and to subtract the eccentricity component from a count value applied with the disturbance. Although this method often causes an error of a maximum of about one track, no problem is posed as long as a large displacement amount is set.

CORRECT LASER POWER MONITOR LINEARITY

According to the present invention, a laser power is controlled by detecting an output signal from the monitor photodiode 79. However, with only this operation, since a monitor output is influenced by light reflected by the disk, a power of the laser beam radiated on the disk cannot be controlled with perfect precision.

According to the present invention, linearity is corrected using light reflected by the disk. Light reflected by the disk is received by the servo sensor 18 to be subjected to current-voltage conversion. Thereafter, the output signal is converted to a sum signal $(S_1+S_2+S_3+S_4)$ by the arithmetic unit 44. The sum signal is then A/D-converted, and the digital signal is input to the digital signal processing circuit 48. On the other hand, the output from the monitor photodiode 79 is input to the digital signal processing circuit 48 via the preamplifier 80 and the A/D converter 63. As shown in FIG. 20, the digital signal processing circuit 48 controls the laser driver 78 to emit a laser beam of 10 mW having relatively good monitor linearity. At this time, if the sum signal is 10 V, the laser output can be given by (sum signal/1,000 (W)). Data representing the relationship with the monitor output can be sampled while decreasing the laser output so that the sum signal output is decreased by, e.g., every 0.1 V. Thus, the monitor output can be corrected based on the sum signal output. Correction data is stored in the memory 71, and the monitor output is corrected based on this data to control the laser power, thus allowing precise laser radiation.

Figure 21:
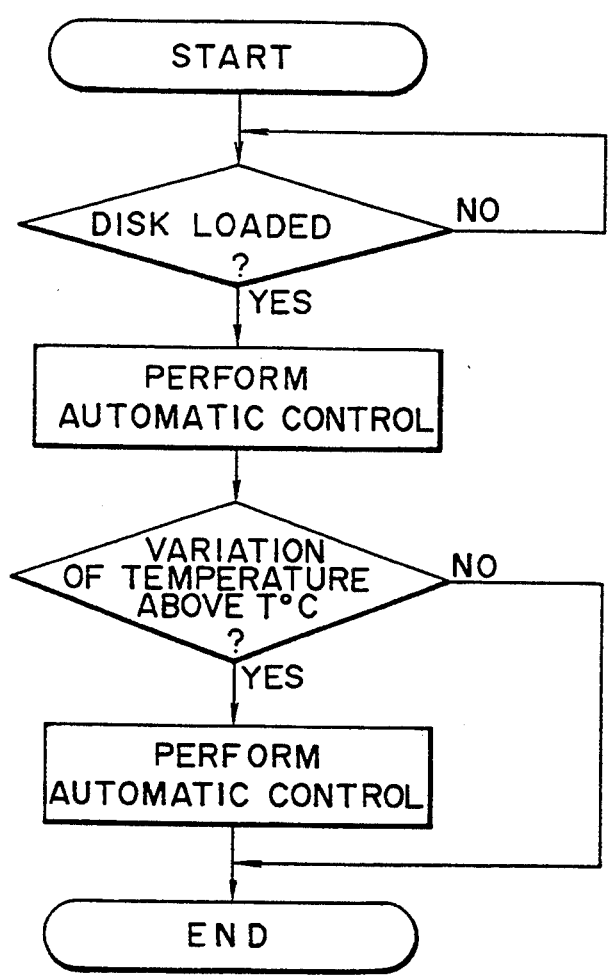
FIG. 21 is a flow chart for explaining an algorithm for embodying the present invention.

FIG. 21 shows an algorithm for embodying a servo system automatic gain control method according to the present invention.

The automatic gain control of the present invention can be performed every time a magnetooptical disk is loaded and the magnetooptical disk apparatus is started or every time the temperature sensor arranged in the apparatus exhibits a change in temperature exceeding a predetermined value in use and a position shift of the optical parts described above is feared. When the automatic gain control is performed every time a new magnetooptical disk is loaded, an alignment error upon adjustment of, e.g., the servo sensor or a position shift after adjustment can be easily corrected. In addition, a variation in AT offset occurring when the object lens is shifted in the radial direction due to a variation in guide groove of the disk, and variations in AF and AT gains can be corrected. At the same time, an AF offset caused by variations in thickness and refractive index of a disk substrate, an AT offset caused by warp of the disk substrate, and the like can also be corrected.

When automatic control is performed every time the temperature sensor exhibits a change in temperature exceeding a predetermined value, a position shift of optical parts caused by the change in temperature, a position shift of a light spot on the servo sensor caused by a change in wavelength of the semiconductor laser, and the like can be corrected. For example, in the magnetooptical disk apparatus shown in FIG. 1, assuming that a beam shaping ratio of the beam shaping prism 3 is set to be 2 and glass is BK7, a deflection angle of a light beam is about 3 sec per change in wavelength by 1 nm. If the focal length of the focusing lens 15 is assumed to be 40 mm, a light spot shift on the servo sensor is about 0.6 micron per change in wavelength by 1 nm. Since the wavelength of the semiconductor laser is changed by 0.3 nm per change in temperature by 1° C., a change in temperature of 30° C. causes a light spot shift of about 6 microns, and this influences tracking servo precision. However, if automatic gain control is performed every time a change in temperature reaches 5° C., a position shift can be converged to a value which poses no problem. Thus, the beam shaping prism need not comprise an expensive achromatic prism as a combination of a plurality of kinds of glass.

The automatic gain control for a servo system has been described. The present invention is not limited to the focus error detection method, the tracking error detection method, and the object lens position detection method described in the above embodiment. Focus and tracking errors may be detected by independent detectors.

In the above embodiment, light reflected by a medium is detected. However, when a medium is of a light transmission type, the transmission light may be detected to calibrate a control means.

What is claimed is:

1. An optical information processing apparatus comprising:

a laser diode for emitting a laser beam to irradiate an optical information recording medium, and for emitting a monitoring light;

a monitor photodiode, attached to said laser diode, for receiving the monitoring light emitted from said laser diode and for generating a photodiode output;

a control circuit for receiving the photodiode output, and for controlling power of the laser beam emitted from said laser diode in accordance with the photodiode output;

a photosensor for receiving one of a laser beam reflected by the recording medium and a laser beam transmitted through the recording medium and for generating a photosensor output; and a correction circuit for automatically correcting linearity of the photodiode output with respect to the power of the laser beam emitted from said laser diode in accordance with the photosensor output.

2. An apparatus according to claim 1, wherein said correction circuit comprises a digital signal processing circuit for calculating correction data in accordance with the photosensor output and memory means for storing said correction data calculated by said digital signal processing circuit.

3. An optical information processing apparatus, comprising:

a light source for radiating a light beam onto an optical information recording medium;

a first photosensor for partially receiving the light emitted from said light source and generating an output;

a control circuit for controlling power of the light beam emitted from said light source using the output from said first photosensor;

a second photosensor for receiving one of a light beam reflected by said recording medium and a light beam transmitted through said recording medium and generating an output;

a correction circuit for automatically correcting linearity of the output of said first photosensor with respect to the power of the light beam emitted from said light source in accordance with the output from said second photosensor;

temperature detection means for detecting a change in temperature in said apparatus; and means for adjusting said correction circuit when the change in temperature detected by said temperature detection means exceeds a predetermined value.

4. An apparatus according to claim 3, wherein said correction circuit comprises a digital signal processing circuit for calculating correction data in accordance with the output from said second photosensor and memory means for storing the correction data calculated by said digital signal processing circuit.

5. An apparatus according to claim 3, wherein said light source comprises a laser diode.

6. A method of controlling power of a laser beam emitted from a laser diode in an optical information processing apparatus comprising (i) a laser diode for emitting the laser beam to irradiate an optical information recording medium and for emitting a monitoring light, (ii) a monitor photodiode attached to the laser diode and (iii) a photosensor, said method comprising the steps of:

emitting the laser beam and the monitoring light from the laser diode;

receiving the monitoring light emitted from the laser diode by the monitor photodiode and generating a first output;

receiving one of a laser beam reflected by the recording medium and a laser beam transmitted through the recording medium by the photosensor and generating a second output;

correcting linearity of the first output with respect to the power of the laser beam to irradiate the recording medium with the laser beam in accordance with the second output; and controlling the power of the laser beam emitted from the laser diode by using the corrected first output.

7. A method according to claim 6, wherein said linearity correcting step comprises the steps of:

obtaining data indicative of a relation between the first output and the second output while varying the power of the monitoring light and the laser beam, emitted from the laser diode;

storing the data into a memory; and correcting the first output by using the data stored in the memory.

8. An optical information processing apparatus comprising:

a laser diode for emitting a laser beam to irradiate an optical information recording medium, and for emitting a monitoring light;

a first photosensor, attached to said laser diode, for receiving the monitoring light emitted from said laser diode, and for producing an output;

control means for controlling power of the laser beam emitted from said laser diode in accordance with the output of said first photosensor;

a second photosensor for receiving one of a laser beam reflected by the recording medium and a laser beam transmitted through the recording medium, and for producing an output; and correction means for automatically correcting linearity of the output of said first photosensor with respect to the power of the laser beam to irradiate the recording medium with the laser beam, in accordance with the output of said second photosensor.

9. An apparatus according to claim 8, wherein said correction means comprises a digital signal processing circuit for calculating correction data from the output of the second photosensor and a memory for storing the correction data calculated by said digital signal processing circuit.

* * * * *